United States Patent
LeBlanc et al.

(10) Patent No.: US 9,036,974 B2
(45) Date of Patent: May 19, 2015

(54) FIBER OPTIC ENCLOSURE WITH TEAR-AWAY SPOOL

(71) Applicant: ADC Telecommunications, Inc., Berwyn, PA (US)

(72) Inventors: Thomas G. LeBlanc, Westminster, MA (US); Scott C. Kowalczyk, Savage, MN (US); Oscar Fernando Bran de León, Belle Plaine, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 182 days.

(21) Appl. No.: 13/744,800

(22) Filed: Jan. 18, 2013

(65) Prior Publication Data

US 2013/0209050 A1    Aug. 15, 2013

Related U.S. Application Data

(60) Provisional application No. 61/588,406, filed on Jan. 19, 2012.

(51) Int. Cl.
| | |
|---|---|
| *G02B 6/46* | (2006.01) |
| *G02B 6/44* | (2006.01) |
| G02B 6/38 | (2006.01) |

(52) U.S. Cl.
CPC .............. *G02B 6/46* (2013.01); *G02B 6/3825* (2013.01); *G02B 6/3897* (2013.01); *G02B 6/4441* (2013.01); *G02B 6/4457* (2013.01); *G02B 6/4466* (2013.01)

(58) Field of Classification Search
CPC .. G02B 6/4457; G02B 6/4458; G02B 6/4471; G02B 6/4472; G02B 6/4476
See application file for complete search history.

(56) References Cited

U.S. PATENT DOCUMENTS

| | | | | |
|---|---|---|---|---|
| 7,522,806 B2* | 4/2009 | Hendrickson et al. | ........ | 385/135 |
| 7,546,018 B2* | 6/2009 | Hendrickson et al. | ........ | 385/135 |
| 7,715,679 B2 | 5/2010 | Kowalczyk et al. | | |
| 7,756,379 B2 | 7/2010 | Kowalczyk et al. | | |
| 7,869,682 B2 | 1/2011 | Kowalczyk et al. | | |
| 8,229,267 B2* | 7/2012 | Kowalczyk et al. | .......... | 385/135 |
| 8,422,847 B2 | 4/2013 | Kowalczyk et al. | | |
| 8,494,334 B2* | 7/2013 | Kowalczyk et al. | .......... | 385/135 |
| 8,565,572 B2 | 10/2013 | Kowalczyk et al. | | |
| 8,774,588 B2* | 7/2014 | Kowalczyk et al. | .......... | 385/135 |
| 2009/0060441 A1* | 3/2009 | Kowalczyk et al. | .......... | 385/135 |
| 2011/0091180 A1* | 4/2011 | Kowalczyk et al. | .......... | 385/135 |
| 2012/0025005 A1* | 2/2012 | Smith et al. | ................... | 242/603 |
| 2013/0044991 A1* | 2/2013 | Kowalczyk et al. | .......... | 385/135 |
| 2013/0209049 A1* | 8/2013 | Kowalczyk et al. | .......... | 385/135 |
| 2013/0209050 A1* | 8/2013 | LeBlanc et al. | ............... | 385/135 |
| 2014/0010512 A1* | 1/2014 | Kowalczyk et al. | .......... | 385/135 |

* cited by examiner

*Primary Examiner* — Rhonda Peace
(74) *Attorney, Agent, or Firm* — Merchant & Gould P.C.

(57) ABSTRACT

Example fiber optic enclosures include a cable spool assembly and a cover. Each disc of the cable spool assembly has a removable section that extends radially outwardly from a central portion of the disc. The cable spool assembly has a first diameter when the removable sections are attached to the discs. The central portion of each disc has a second diameter. The cover has a lateral dimension that is smaller than the first diameter of the cable spool assembly and larger than the second diameter of the cable spool assembly. Certain types of spool assemblies include a termination region including a plurality of adapters that rotate in unison with the first disc of the cable spool assembly.

30 Claims, 8 Drawing Sheets

FIBER OPTIC ENCLOSURE WITH TEAR-AWAY SPOOL

CROSS-REFERENCE TO RELATED APPLICATION

The present application claims the benefit of U.S. Provisional Patent Application Ser. No. 61/588,406, filed Jan. 19, 2012, which application is hereby incorporated by reference in its entirety.

TECHNICAL FIELD

The present disclosure relates to fiber optic enclosures, and more particularly, to fiber optic enclosures with cable payout.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

An aspect of the present disclosure relates to a fiber optic enclosure including a cable spool assembly including a first flange and a second flange spaced apart axially along a drum portion to define a storage space. Each flange has a removable section that extends radially outward from a central portion of the flange. The cable spool assembly has a first cross-dimension when the removable sections are attached to the flanges. The central portion of each flange has a second cross-dimension. The cover is configured to mount over the cable spool assembly after the removable sections are removed from the cable spool assembly. The cover has a cross-dimension dimension that is smaller than the first cross-dimension of the cable spool assembly and larger than the second cross-dimension of the cable spool assembly.

In certain implementations, the cable spool assembly includes a termination region including a plurality of adapters that rotate in unison with the cable spool assembly.

Another aspect of the present disclosure relates to a method of paying out a subscriber cable having at least one connectorized end plugged into an adapter disposed at a termination region of a cable assembly. The method includes unwinding a length of subscriber cable from a cable spool assembly by rotating the cable spool assembly relative to a drum plate assembly while the connectorized end of the subscriber cable is plugged into the adapter; removing at least one tear-away section of the cable spool assembly to reduce a cross-dimension of the cable spool assembly from a first cross-dimension to a second cross-dimension; and mounting a cover over the cable spool assembly after removing the tear-away section. The cover has at least one lateral dimension that is less than the first cross-dimension and greater than the second cross-dimension.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
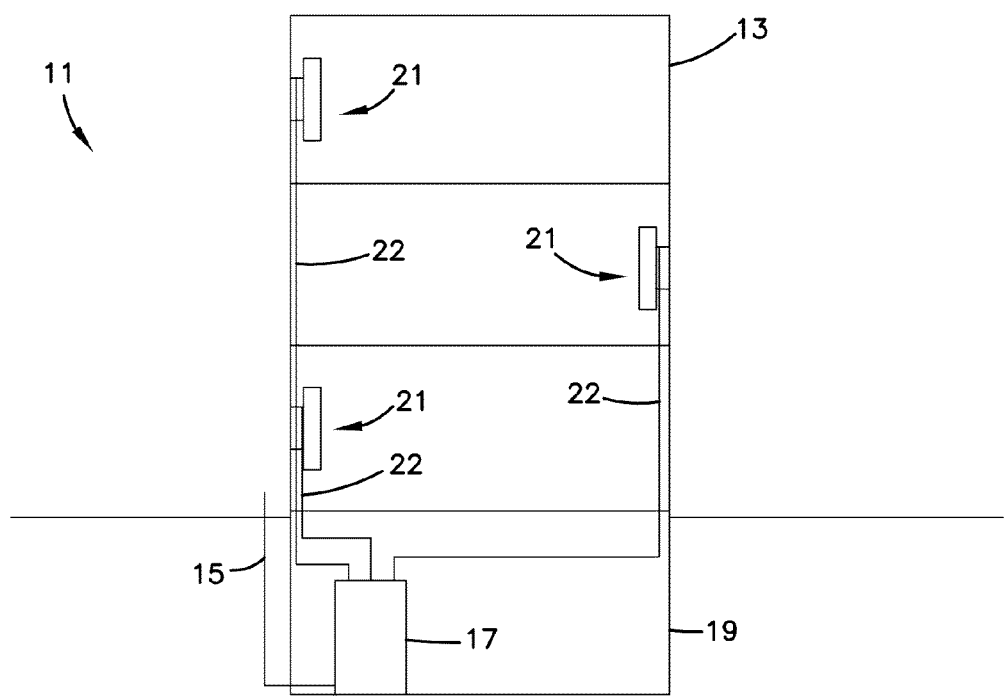
FIG. 1 is a schematic representation of a fiber optic network that includes a fiber optic enclosure having features that are examples of aspects in accordance with the principles of the present disclosure.

Referring now to FIG. 1, a schematic representation of a fiber optic network, generally designated 11, in a facility 13 (e.g. individual residence, apartment, condominium, business, etc.) is shown. The fiber optic network 11 includes a feeder cable 15 from a central office (not shown). The feeder cable 15 enters a feeder cable input location 17 (e.g., a fiber distribution hub, a network interface device, etc.) having one or more optical splitters (e.g., 1-to-8 splitters, 1-to-16 splitters, 1-to-32 splitters, etc.) that generate a number of individual fibers.

In the example shown, and by way of example only, the feeder cable input location 17 is located on a lower level 19 of the facility 13. Each unit in the facility 13 includes a fiber optic enclosure, generally designated 21. One or more subscriber cables 22 extend from each of the fiber optic enclosures 21 to the feeder cable input location 17. The subscriber cable(s) 22 extending between the feeder cable input location 17 and the fiber optic enclosure 21 typically includes multiple optical fibers.

Figure 2:
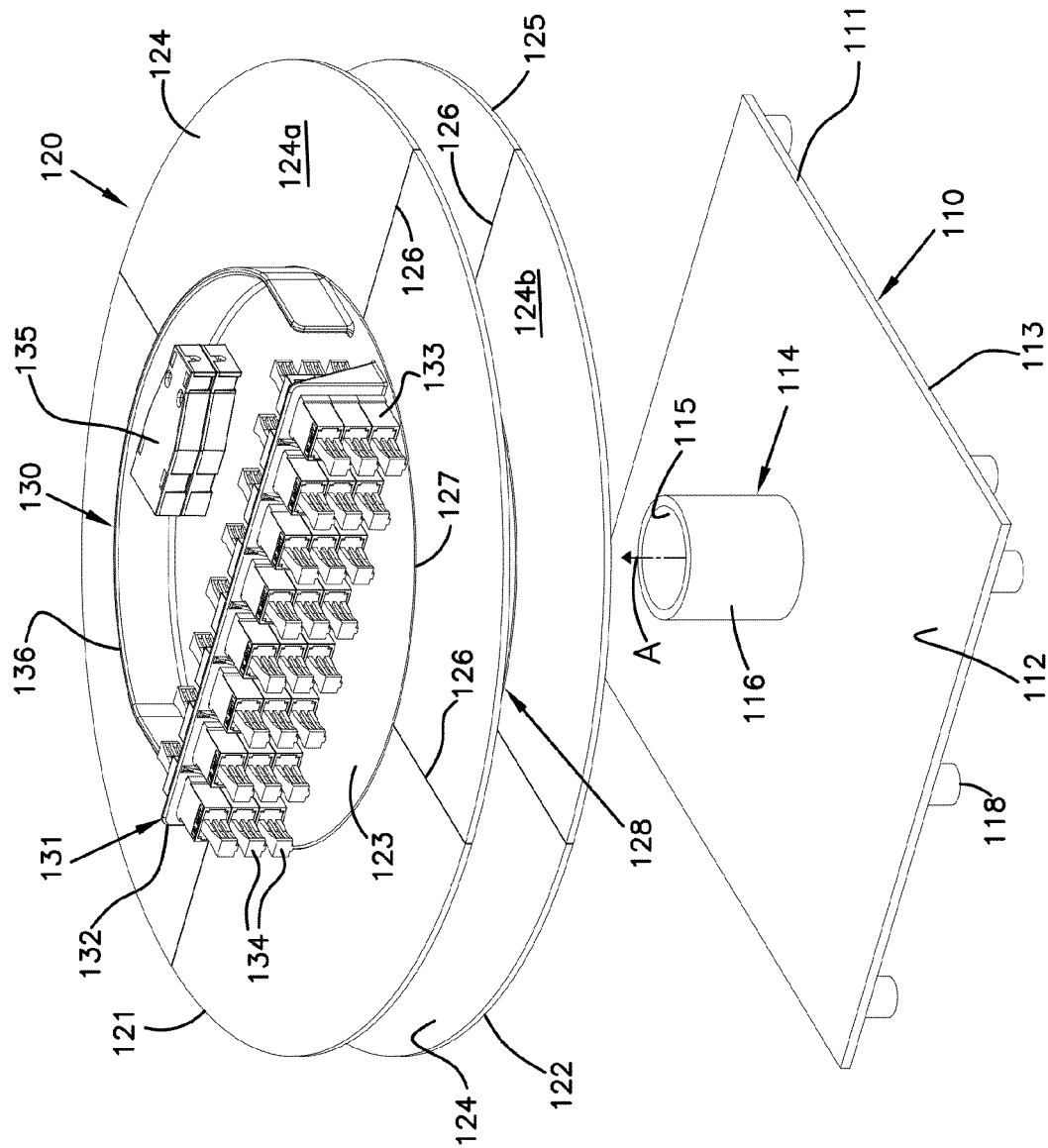
FIG. 2 is an isometric view of a cable storage assembly showing a tear-away spool assembly exploded upwardly from a drum base assembly.
Figure 3:
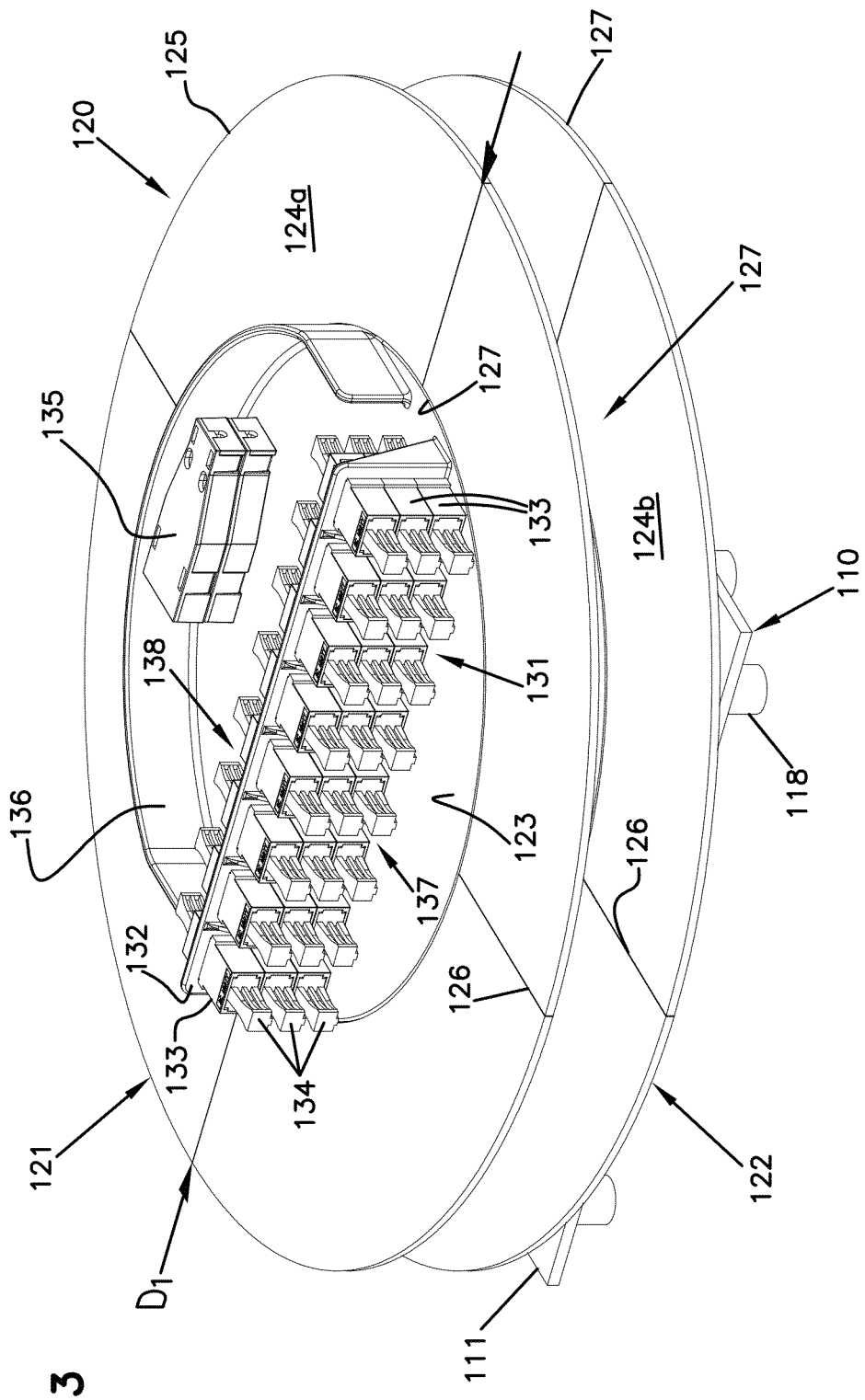
FIG. 3 is an isometric view of the cable storage assembly of FIG. 2.

Referring to FIGS. 2 and 3, the subscriber cable 22 may be deployed (i.e., paid out) during or prior to installation of the fiber optic enclosure 21. The subscriber cable 22 is initially stored on a cable storage assembly 100 that includes a tear-away spool assembly 120. In certain implementations, the tear-away spool assembly 120 may be mounted to a drum base assembly 110. In some implementations, the tear-away spool assembly 120 is rotatable relative to the drum base assembly 110. In other implementations, the tear-away spool assembly 120 and the drum base assembly 110 are configured to rotate in unison relative to a mounting plate or other attachment frame (e.g., through a bearing, such as a lazy-susan bearing or a ball bearing).

The drum plate assembly 110 includes a plate portion 111, a drum portion 114, and a mounting arrangement 118. In the example shown, the plate portion 111 includes a generally planar forward surface 112 having a perimeter that is generally rectangular in shape. It will be understood, however, that the scope of the present disclosure is not limited to the plate portion 111 having a generally planar surface 112 or having a perimeter that is generally rectangular in shape. For example, the perimeter could be circular, triangular, etc.

The drum portion 114 extends outwardly from the forward surface 112 of the plate portion 111. In certain implementations, the drum portion 114 extends outwardly in a generally perpendicular direction to the plate portion 111. In the example shown, the drum portion 114 extends outwardly from a center portion of the plate portion 111. In other implementations, the drum portion 114 may be offset from the center portion of the plate portion 111. The drum portion 114 is generally cylindrical in shape having an internal bore 115 and an outer surface 116. The internal bore 115 extends through the drum portion 114 and defines a central axis A of the drum plate assembly 110.

The mounting arrangement 118 is disposed at a rearward surface 113 of the plate portion 111 of the drum plate assembly 110. In some implementations, the mounting arrangement 118 includes one or more brackets that are is rigidly engaged to the plate portion 111 of the drum plate assembly 110 by one or more fasteners (e.g., bolts, screws, rivets, etc.), which extend through a plurality of mounting holes in the plate portion 111 and through a plurality of mounting apertures, which are aligned with the mounting holes, in the brackets. When mounted to the plate portion 111, the mounting bracket(s) extends outwardly from the planar surface 113 of the plate portion 111 in a generally perpendicular direction. In other implementations, the mounting arrangement 118 may include pegs, latching fingers, or any other attachment members that extend from the rear 113 of the plate portion 111. In still other implementations, the plate portion 111 defines apertures through which fasteners may extend to secure the plate portion 111 to a surface (e.g., a wall, a bulkhead, etc.).

The tear-away spool assembly 120 includes a first flange 121 and a second flange 122 that are disposed along opposite ends of a drum to form a storage space 128. In the example shown, the flanges 121, 122 are round discs. In other implementations, however, the flanges 121, 122 may be any desired shape (e.g., rectangular, triangular, etc.). In some implementations, the discs 121, 122 couple to the drum portion 114 of the drum plate assembly 110 at axially spaced positions. The second disc 122 is disposed closer to the drum plate assembly 110 than the first disc 121. The subscriber cable 22 may be wound around the drum portion 114 within the storage space 128 between the two discs 121, 122. The spool assembly 120 includes a termination region 130 disposed at an inner section 123 of the first disc 121 as will be disclosed in more detail herein.

Each disc 121, 122 includes one or more tear-away sections 124 that may be removed from the spool assembly 120 after the subscriber cable 22 is deployed (i.e., unwound from the storage space 128). For example, the first disc 121 includes one or more tear-away sections 124a and the second disc 122 includes one or more tear-away sections 124b. Each tear-away section 124a, 124b extends radially outwardly from the inner section 123 of the disc 121, 122. In the example shown, the first and second tear-away sections 124a, 124b are generally similar in structure. Therefore, for ease of description, the first and second tear-away ends 124a, 124b will be commonly referred to as "the tear-away end 124". It will be understood, however, that the scope of the present disclosure is not limited to the first and second tear-away ends 124a, 124b being similar.

The tear-away end 124 is generally circular in shape and includes an outside circumference 125. The tear-away end 124 also includes at least one radial area of weakness 126. In some implementations, the area of weakness 126 radially extends from the outside circumference 125 of the tear-away end 124 to an inner circumference 127. In certain implementations, and by way of example only, there are four radial areas of weakness 126 dispose on the tear-away end 124 that radially extend from the outer circumference 125 to the inner circumference 127. In the example shown, the four radial areas of weakness 126 are disposed so as to be 90 degrees apart. In certain implementations, the inner circumference 127 defines a circular area of weakness. In the example implementation, the radial and circular areas of weakness 126, 127 are areas of reduced thickness.

In the subject embodiment, the tear-away end 124 is manufactured from a plastic material such as acrylonitrile butadiene styrene (ABS) having a thickness of 0.09 inches. It will be understood, however, that the scope of the present disclosure is not limited to the tear-away end 124 being made from ABS or to the tear-away end 124 having a thickness of 0.09 inches as the tear-away end 124 could be made from other materials including but not limited to cardboard of various thicknesses. In the embodiment in which the areas of weakness 126, 127 are an area of reduced thickness, the thickness of the areas of weakness 126, 127 are less than one-half of the thickness of the tear-away end 124. In another embodiment, the thickness of the areas of weakness 126, 127 are less than one-third of the thickness of the tear-away end 124. In yet another embodiment, the thickness of the areas of weakness 126, 127 are less than one-quarter (¼) of the thickness of the tear-away end 124. In one embodiment, the thickness of the areas of weakness 126, 127 are about 0.015 inches. In the embodiments in which the areas of weakness 126, 127 are an area of reduced thickness, a slit is disposed at the outer circumference 125 of the tear-away end 124 to serve as a point at which tearing can be initiated.

The first and second tear-away ends 124a, 124b are oppositely disposed on the outer surface 116 of the drum portion 114. In the subject embodiment, the first and second tear-away ends 124a, 124b are in close fit engagement with the outer surface 116 such that the first and second tear-away ends 124a, 124b may rotate slightly. In one embodiment, the first and second tear-away ends 124a, 124b are in tight fit engagement with the outer surface 116 of the drum portion 114. The first and second tear-away ends 124a, 124b are oriented along the drum portion 114 such that a portion of the outer surface 116 of the drum portion 114 is disposed between the first and second tear-away ends 124a, 124b so that a length of the subscriber cable 22, having multiple optical fibers, can be coiled around the portion of the outer surface 116 between the first and second tear-away ends 124a, 124b (i.e., within storage space 128). In order to protect the subscriber cable 22 from attenuation resulting from coiling of the subscriber cable 22 around the drum portion 114, the outer surface 116 has a radius that is greater than the minimum bend radius of the subscriber cable 22.

The termination region 130 is disposed at a side of the inner section 123 of the first disc 121 that faces away from the second disc 122. The termination region 130 is disposed within the region of the first disc 121 that is surrounded by the first tear-away section 124a. In the example shown, the termination region 130 is disposed within a region defined by the inner radius 127 of the first tear-away section 124a. In certain implementations, the termination region 130 may be at least partially bordered by a wall 136. In the example shown, a low wall 136 extends adjacent and partway along the inner circumference 127 of the first tear-away section 124a. For example, the wall 136 may extend about half-way along the inner circumference 127. In certain implementations, ends of the wall 136 extend inwardly from the inner circumference 127.

The termination region 130 includes a connection point 131 at which one or more optical fibers of the subscriber cable 22 may be interfaced with other optical fibers. The connection point 131 includes one or more adapters 133 disposed at a frame 132 or other support. The adapters 133 have first ports 137 and second ports 138 that are each configured to receive a fiber optic connector. In some implementations, the adapter ports 137, 138 are each configured to receive a fiber optic connector terminating a single optical fiber (e.g., an LC-type connector, an SC-type connector, and ST-type connector, an LX.5-type connector, an FC-type connector, etc.). In other implementations, the adapter ports 137, 138 are each configured to receive a fiber optic connector terminating multiple optical fibers (e.g., an MPO connector, an MT connector, etc.). In the example shown, adapter dust caps 134 are disposed in the ports 137, 138.

The termination region 130 also includes a fanout arrangement 135 to separate optical fibers of the subscriber cable 22 into individual connectorized fibers. In the example shown, the fanout arrangement 135 includes two fanouts. In other implementations, however, the fanout arrangement 135 may include a greater or lesser number of fanouts. In the example shown, the fanout arrangement 135 is disposed at an intermediate point along the length of the wall 136 to protect the optical fibers extend towards and away from the fanout arrangement 135. In certain implementations, the fanout arrangement 135 extends generally parallel to the frame 132. In the example shown, the second adapter ports 138 of the connection point 131 face towards the fanout arrangement 135.

Figure 5:
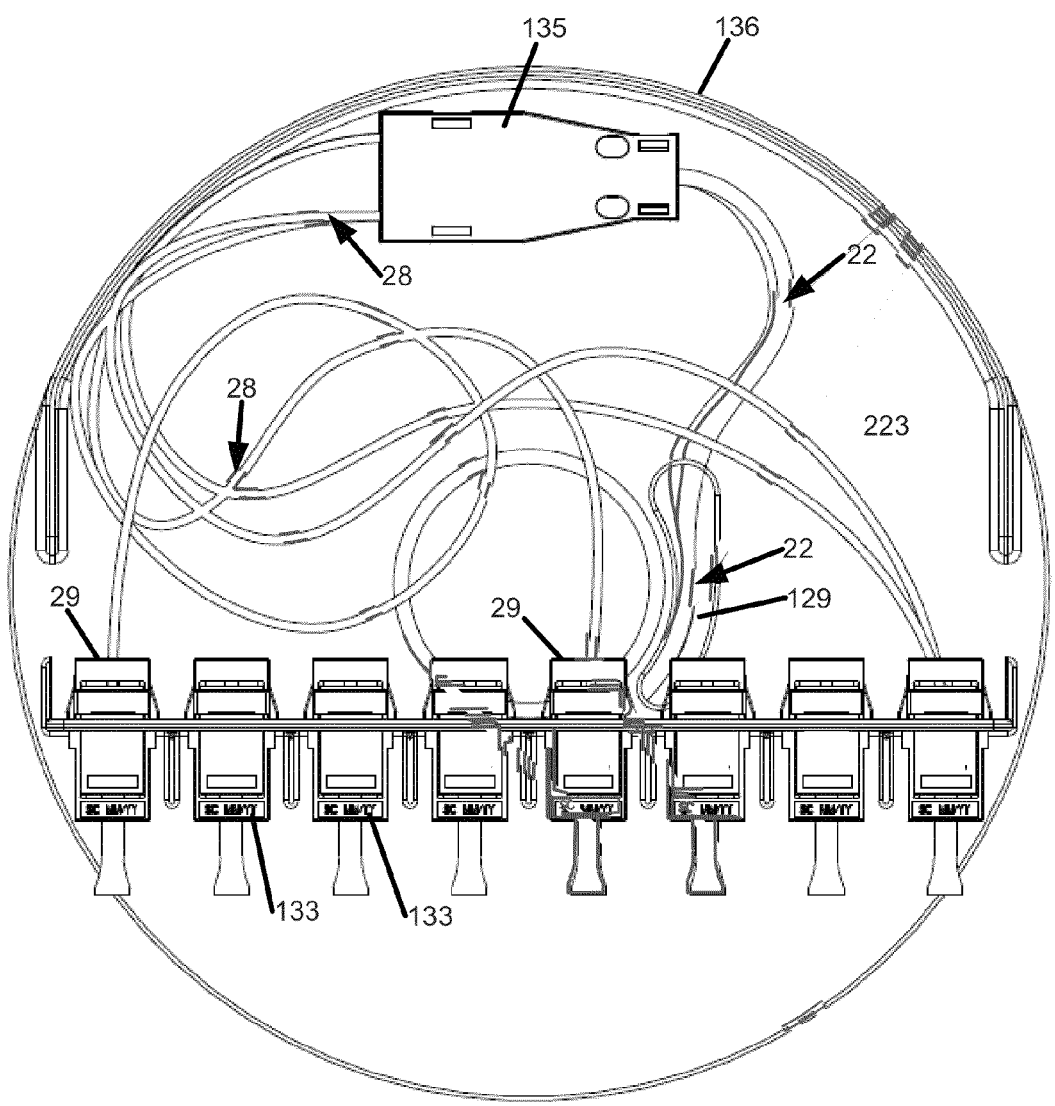
FIG. 5 is a top, plan view of the tear-away spool assembly of FIG. 2 with connectorized ends of a subscriber cable plugged into adapters at a termination region.

The subscriber cable 22 includes a first end and a second end. The first end of the subscriber cable 22 is routed to the termination 130. For example, as shown in FIG. 5, the first end of the subscriber cable 22 is routed through an aperture 129 in the first disc 121 from the storage section 128 to the termination region 130. In the example shown, the aperture is elongated and located adjacent the outer wall 116 of the drum 114. The first end of the subscriber cable 22 is routed from the aperture 129 to the fanout arrangement 135. In some implementations, the first end of the subscriber cable 22 is routed around guides or bend radius limiters along a path between the aperture 129 and the fanout arrangement 135. In some implementations, the first end of the subscriber cable 22 is routed to the fanout 135 before the second end of the subscriber cable 22 is removed from the spool 120. In other implementations, the first end of the subscriber cable 22 is routed to the fanout 135 after the second end of the subscriber cable 22 is paid out.

The second end of the subscriber cable 22 is configured for connectivity with the feeder cable input location 17. Accordingly, the length of the subscriber cable 22 is sufficient to reach between the fiber optic enclosure 21 and the feeder cable input location 17. In one embodiment, the length of subscriber cable 22, which is coiled around the cable spool assembly 120, is in the range of 100 to 500 feet. In another embodiment, the length of subscriber cable 120 coiled around the cable spool assembly 25 is 300 feet. However, as shown in FIG. 1, the length of subscriber cable 22 needed between each of the fiber optic enclosures 21 in the facility 13 and the feeder cable input location 17 will vary depending upon the location of each fiber optic enclosure 21 with respect to the feeder cable input location 17.

The cable spool assembly 120 provides dual functionality by serving as a storage location for the subscriber cable 22 and by selectively paying out a desired length of the subscriber cable 22. The cable spool assembly 120 enables a user to account for the varying lengths of subscriber cable 22 needed between the fiber optic enclosure 21 and the feeder cable input location 17. Methods of installing and using a fiber optic enclosure 21 and cable spool assembly 120 are provided below.

A given length of subscriber cable 22 is loaded onto the cable spool assembly 120 by coiling the length of subscriber cable 22 within the storage section 128 of the cable spool assembly 120. For example, at least part of the length of the subscriber cable 22 is wound around the drum portion 114 of the cable spool assembly and stored in the storage section 128. In some implementations, the cable spool assembly 120 is rotated during to load the subscriber cable 22 into the storage section 128. In other implementations, the subscriber cable 22 is wound into the storage section 128 without rotating the cable assembly 120.

In some implementations, the first end of the subscriber cable 22 is routed to the termination region 130 during the loading step. For example, in certain implementations, the first end of the subscriber cable 22 is routed to the fanout arrangement 135 where individual fibers of the subscriber cable 22 are separated into connectorized ends. The connectorized ends of the individual subscriber fibers are plugged into the second ports 138 of the adapters 133 at the connection point 131. In other implementations, the first end of the subscriber cable 22 is disposed in the storage section 128 of the cable spool assembly prior to installation of the cable spool assembly 120.

The second function of the cable spool assembly 120 involves the selective payout of the subscriber cable 22. In some implementations, the subscriber cable 22 can be paid out with the first end of the subscriber cable 22 in connected engagement with the second ports 138 of the adapters 133 of the termination region 130. Because the termination region 130 is disposed on the cable spool assembly 120, the cable spool assembly 120 carries the components of the termination region 130 as the spool assembly 120 is rotated. Thus, the cable spool assembly 120 and the components of the termination region 130 can rotate in unison relative to a mounting surface (e.g., a wall, a bulkhead, a panel, a post, etc.). For example, the adapters 133 and fanout 135 of the termination region 130 may rotate in unison with the discs 121, 122 of the cable spool assembly 120. In other implementations, the first end of the subscriber cable 22 is located within the storage section 128 of the cable spool assembly 120 while the subscriber cable 22 is being paid out. In such implementations, the first end of the subscriber cable 22 rotates in unison with the cable spool assembly 120.

In some implementations, the subscriber cable 22 is paid out by mounting the drum plate assembly 110 of the cable spool assembly 120 to a wall or other surface and pulling the second end of the subscriber cable 22 towards the feeder cable input location 17. In other implementations, the subscriber cable 22 is paid out by positioning the second end of the subscriber cable 22 at the feeder cable input location 17 and unwinding at least part of the length of the subscriber cable 22 from the cable spool assembly 120 as the cable spool assembly 120 is moved (e.g., walked) away from the feeder cable input location 17 and towards a mounting location for the cable spool assembly 120. In certain implementations, the second end of the subscriber cable 22 may be connected to the feeder cable input location 17 before unwinding the subscriber cable 22.

When a sufficient amount of the subscriber cable 22 has been paid out, the tear-away ends 124 of the cable spool assembly 120 can be removed. To remove the tear-away ends 124 of the cable spool assembly 120, the tear-away ends 124 are split along the areas of weakness 126, 127. In certain implementations, the areas of weakness 126, 127 can be split by breaking, tearing, cutting, ripping, etc. For example, the radially extending areas of weakness 126 may be split along the lengths of the areas of weakness 126. When the split reaches the inner circumference 127 of the tear-away ends 124, openings created by splitting the area of weakness 126 can be expanded by splitting the circular areas of weakness 127 so that the tear-away ends 124 can be removed from the inner sections 123 of the cable spool assembly 120.

Figure 4:
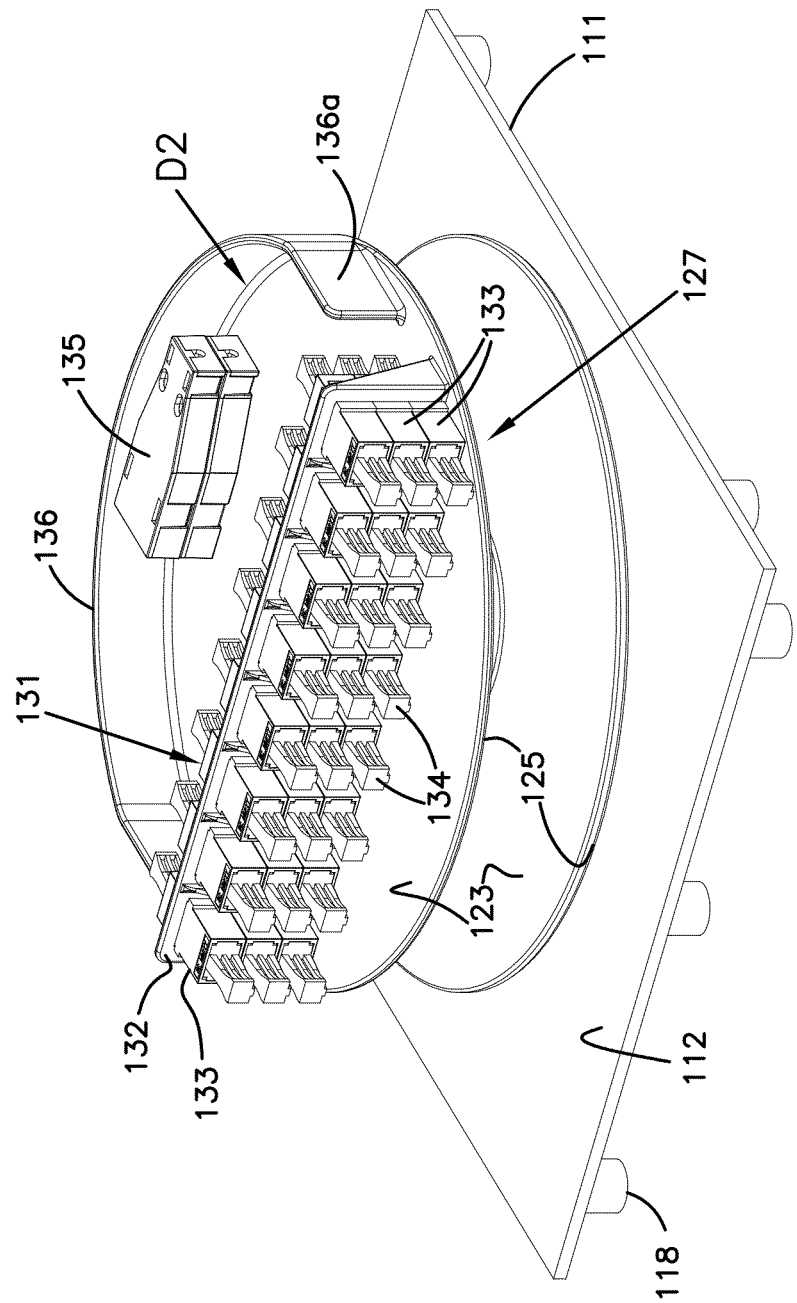
FIG. 4 is an isometric view of the cable storage assembly of FIG. 3 with the tear-away sections removed.

Removing the tear-away ends 124 of the cable spool assembly 120 reduces a cross-dimension of the cable spool assembly 120. For example, prior to removing the tear-away ends 124, the cable spool assembly 120 has a first cross-dimension D1 (FIG. 3). After removing the tear-away ends 124, the cable spool assembly 120 has a second cross-dimension D2 (FIG. 4) that is less than the first cross-dimension D1. When the cable spool assembly 120 is reduced to the second cross-dimension D2, the volume of the storage section 128 of the cable spool assembly 120 may no longer be sufficiently large to hold the length of the subscriber cable 22. In the example shown, the flanges 121, 122 of the cable spool 120 are discs and, accordingly, the cross-dimension is the diameter of each disc 121, 122. In other implementations, the cross-dimension may refer to the width, depth, length or any other such dimension of the flanges 121, 122 that extends transverse to the rotation axis of the cable spool assembly 120.

Once the desired length of subscriber cable 22 has been paid out, the rotation of the cable spool assembly 120 is ceased. In certain implementations, the spool assembly 120 is locked relative to the base plate 111. Connectorized ends of individual fibers of one or more drop cables may be connected to the first ports 137 of the adapters 133. The drop cable(s) is then routed from the cable spool assembly 120 to one or more end users (e.g., to wall sockets within the facility 13, to equipment located within the facility 13, etc.). In some implementations, the drop cable fibers are plugged into the adapter ports 137 after the tear-away ends 124 have been removed. In other implementations, the drop cable fibers are plugged into the adapter ports 137 before the tear-away ends 124 have been removed.

Figure 6:
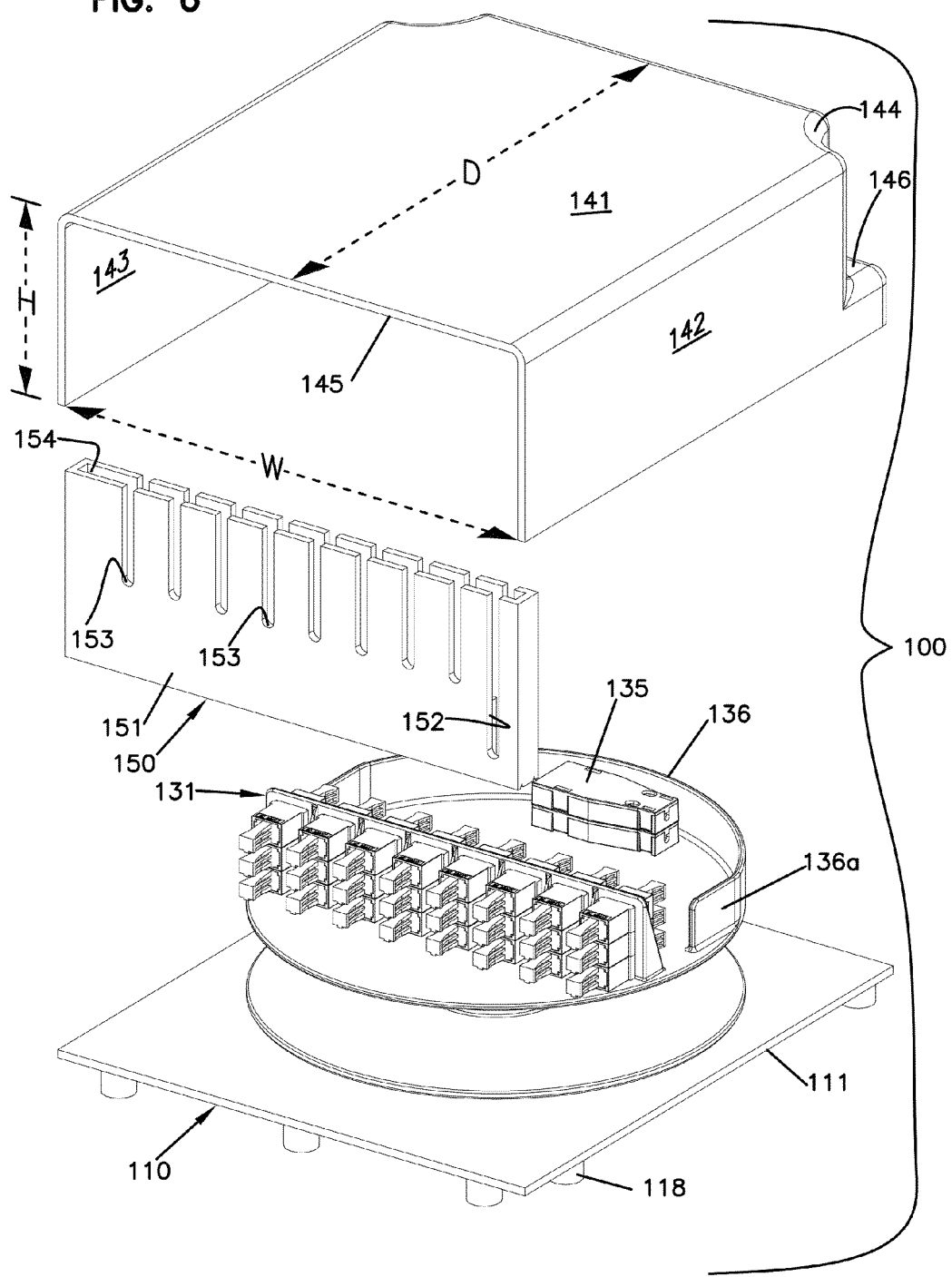
FIG. 6 is an isometric view of a fiber optic enclosure including the cable storage assembly of FIG. 4 with a cover and a grommet exploded outwardly.
Figure 7:
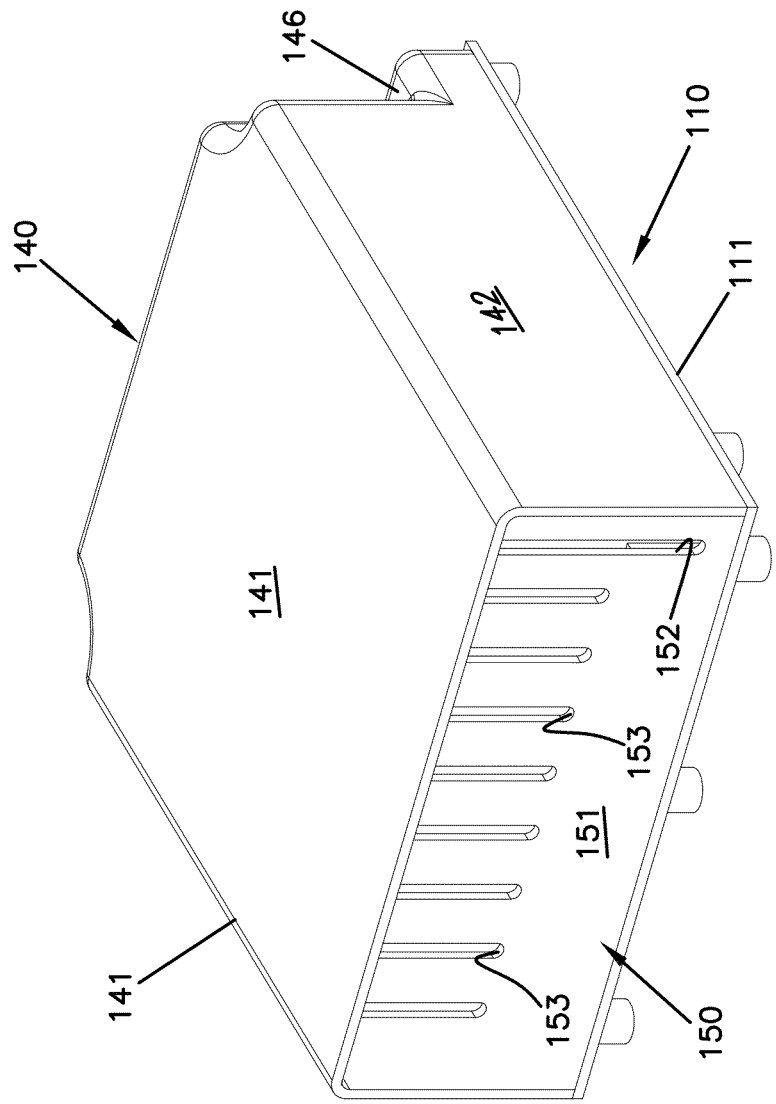
FIG. 7 is an isometric view of the fiber optic enclosure shown schematically in FIG. 1 including the cover, grommet, and cable storage assembly of FIG. 5.

As shown in FIGS. 6 and 7, a cover 140 may be mounted over the cable spool assembly 120 to form the fiber optic enclosure 21. In certain implementations, the cover 140 is mounted over the cable spool assembly 120 after the tear-away sections 124 have been removed from the cable spool assembly 120. The cover 140 includes a main surface 141 from which one or more side walls extend downwardly to define a perimeter of the cover 140. In the example shown, three sidewalls 142-144 extend downwardly from a generally rectangular main surface 141. In some implementations, at least part of the perimeter is open. In the example shown, an open side 145 extends between the first and second side walls 142, 143.

In some implementations, the cover 140 may be locked or otherwise held in the closed (i.e., covering) position relative to the cable spool 120. In certain implementations, the cover 140 includes attachment sections 146 that define apertures through which fasteners may extend to secure the cover 140 to a surface. In certain implementations, the attachment sections 146 are recessed downwardly from the main surface 141. In the example shown, the attachment sections 146 are defined at the corners of the main surface 141 opposite the open side 145. In other implementations, the attachment sections 146 may be located at any part of the cover 140.

The cover 140 has at least one lateral dimension (e.g., width W, a depth D, a diameter if circular, etc.) that is at least as large as the second cross-dimension D2 of the cable assembly 120 (see FIG. 6). In certain implementations, the lateral dimension of the cover 140 also is at least as large as the surface dimensions (e.g., length and width) of the drum plate assembly 110. In other implementations, the cover 140 is sized to mount to the drum plate assembly 110 (see FIG. 7). In certain implementations, the lateral dimension of the cover 140 is less than the first cross-dimension D1 of the cable spool assembly 120. Accordingly, in such implementations, the cover 140 is unable to mount over the cable spool assembly 120 before the tear-away ends 124 are removed. In certain implementations, the width W and the depth D of the cover 140 are each less than the first cross-dimension D1. A height H of the cover 140 is sufficiently large to enable the cover 140 to be mounted over the cable spool assembly 120 so that the main surface 141 extends over the termination region 130.

In some implementations, an entrance/exit guide arrangement 150 defines at least one subscriber cable port 152 for the subscriber cable 22 to enter/exit the enclosure 21. The entrance/exit guide arrangement 150 also defines at least one drop cable port 153 through which the drop cable fibers or drop cable may enter/exit the enclosure 21. In the example shown, the entrance/exit wall arrangement 150 defines eight drop cable ports 153 and one subscriber cable port 152. In other implementations, the entrance/exit guide arrangement 150 may define a greater or lesser number of drop cable ports 153 and/or subscriber cable ports 152. In the example shown, the subscriber cable port 152 is disposed at one end of the subscriber cable ports 153.

In the example shown, the cable ports 152, 153 define elongated slots in a body 151 of the guide arrangement 150. In some implementations, the drop cable ports 153 extend along a shorter distance than the subscriber cable port 153. In the example shown, the subscriber cable port 152 extends along a majority of the height H of the enclosure 21 (see FIG. 7). In other implementations, however, the subscriber port 152 may extend along less than a majority of the height H of the enclosure 21.

In certain implementations, a sealing arrangement is disposed at the cable ports 152, 153 to inhibit ingress of dirt, water, or other contaminants into the enclosure 21. In the example shown, the body 151 of the entrance/exit guide arrangement 150 includes a first wall spaced from a second wall to provide a gap 154 in which a gasket or other seal may be disposed. The gasket may be formed from a flexible polymer or other sealing material that compresses against the subscriber fibers as the subscriber fibers exit the enclosure 21. In certain implementations, the gasket also compresses against the first optical cables/fibers as the optical cables/fibers pass through the ports 152, 153.

Figure 8:
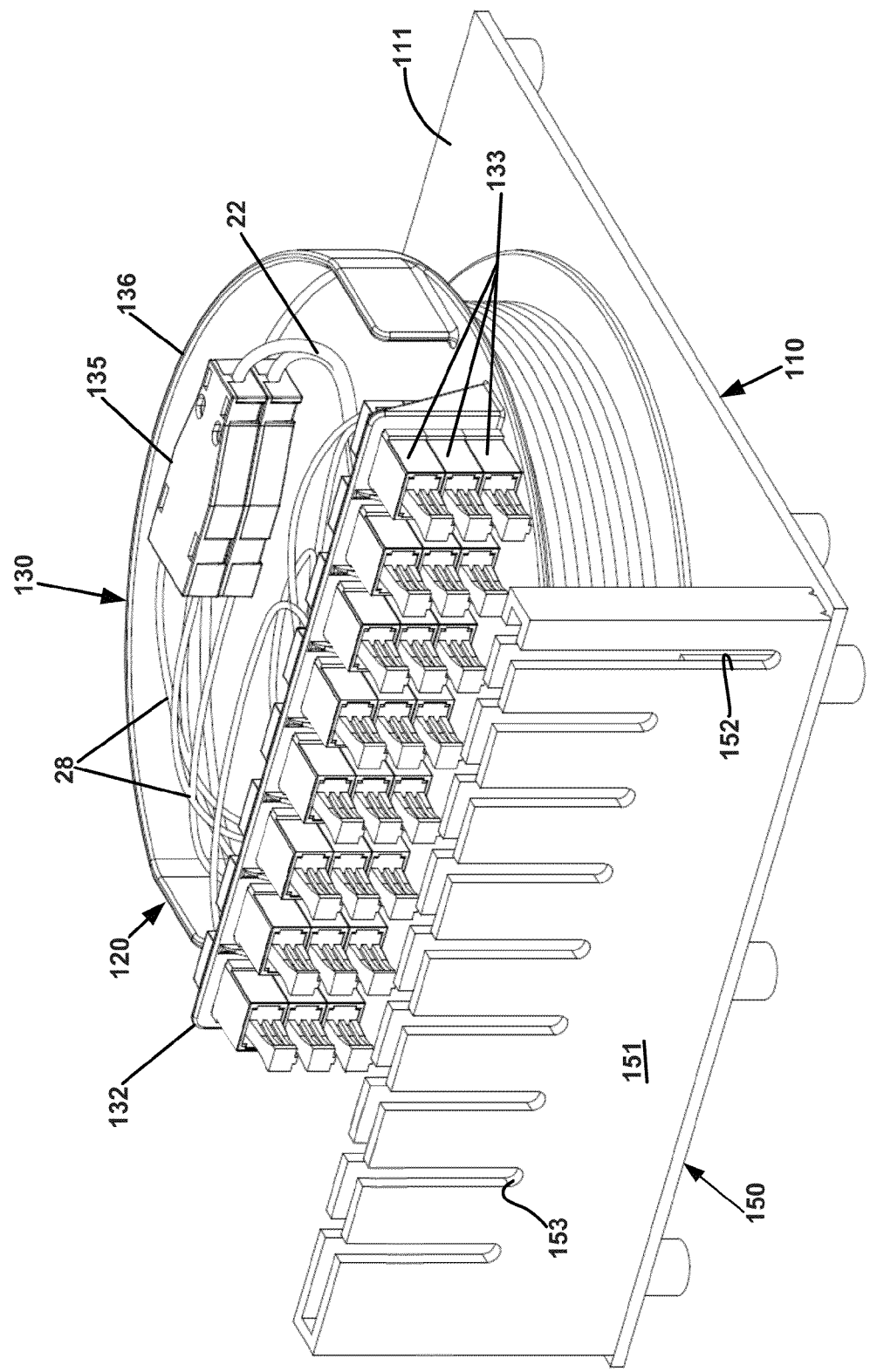
FIG. 8 is an isometric view of the fiber optic enclosure of FIG. 7 with the cover removed and some cabling shown in the termination region.

In some implementations, at least one the drop cable fibers are routed to the adapters 133 at the termination region 130 before the cover 140 is mounted over the cable spool assembly 120. In other implementations, the cover 140 and guide arrangement 150 may be mounted over the cable spool assembly 120 before any drop cable fibers are routed to the termination region 130. In certain implementations, the cover 140 may be removed from the enclosure 21 to provide access to the termination region 130 and slots 152, 153 of the guide arrangement 150 to enable one or more drop cable fibers to be routed to the termination region 130 (see FIG. 8).

The above specification, examples and data provide a complete description of the manufacture and use of the composition of the invention. Various modifications and alterations of this disclosure will become apparent to those skilled in the art without departing from the scope and spirit of this disclosure, and it should be understood that the scope of this disclosure is not to be unduly limited to the illustrative embodiments set forth herein. Accordingly, the invention resides in the claims hereinafter appended.

What is claimed is:

1. A fiber optic enclosure comprising:
    a cable spool assembly including a first disc and a second disc spaced apart axially along a drum portion to define a storage space, each disc having a removable section that extends radially outward from a central portion of the disc, the cable spool assembly having a first diameter when the removable sections are attached to the discs, the central portion of each disc having a second diameter;
    a termination region disposed on an outer surface of the central portion of the first disc of the cable assembly, the termination region including a plurality of adapters that rotate in unison with the first disc;
    a base plate including a generally planar surface, wherein the second disc is disposed closer to the base plate than the first disc; and
    a cover that cooperates with the base plate after the removal sections are removed from the cable spool assembly to form a single chamber enclosure, wherein the cable spool assembly and the termination region are mounted within the single chamber enclosure, the cover having a lateral dimension that is smaller than the first diameter of the cable spool assembly and larger than the second diameter of the cable spool assembly.

2. The fiber optic enclosure of claim 1, wherein the cable spool assembly is mounted to a drum plate assembly that is configured to mount to a surface so that the cable spool assembly is rotatable relative to the surface.

3. The fiber optic enclosure of claim 2, wherein the cable spool assembly is rotatable relative to the drum plate assembly.

4. The fiber optic enclosure of claim 2, wherein the termination region also includes a fanout arrangement.

5. The fiber optic enclosure of claim 2, wherein the adapters are mounted to a frame extending upwardly from the first disc.

6. The fiber optic enclosure of claim 5, wherein the adapters include eight columns of three adapters.

7. The fiber optic enclosure of claim 2, wherein the termination region also includes a wall that extends at least partly around the termination region.

8. The fiber optic enclosure of claim 2, further comprising a subscriber cable having a first end and a second end, the first end of the subscriber cable being routed to the adapters at the termination region and a portion of the subscriber cable being wound within the storage space of the cable assembly.

9. The fiber optic enclosure of claim 1, wherein the removable section of each disc is attached to the central portion of the disc along a circular weakened area.

10. The fiber optic enclosure of claim 9, wherein additional weakened areas extend radially from the weakened area of each disc.

11. The fiber optic enclosure of claim 10, wherein the additional weakened areas include four weakened areas.

12. A method of paying out a subscriber cable having at least one connectorized end plugged into an adapter disposed at a termination region of a cable assembly, the method comprising:
    unwinding a length of subscriber cable from a cable spool assembly by rotating the cable spool assembly relative to a drum plate assembly while the connectorized end of the subscriber cable is plugged into the adapter;
    removing at least one tear-away section from a first disc and a second disc of the cable spool assembly, the at least one tear-away section extending radially outward from a central portion of each of the first and second discs of the cable spool assembly, wherein removing the at least one tear-away section from the first and second discs reduces a cross-dimension of the cable spool assembly from a first cross-dimension to a second cross-dimension, wherein the first cross-dimension is defined by the at least one tear-away section being attached to the first and second discs and the second cross-dimension is defined by the central portion of the first and second discs after the at least one tear-away section is removed, wherein the termination region is mounted to an outer surface of the central portion of the first disc; and
    mounting a cover to the drum plate assembly after removing the at least one tear-away section to form a single chamber enclosure, wherein the cable spool assembly and the termination region are mounted within the single chamber enclosure, wherein the cover has at least one lateral dimension that is less than the first cross-dimension and greater than the second cross-dimension.

13. The method of claim 12, wherein mounting the cover comprises:
    feeding the subscriber cable through a first port of an entrance/exit guide arrangement; and
    positioning the entrance/exit guide arrangement at an open side of the cover.

14. The method of claim 12, wherein removing the at least one tear-away section from each of the two discs comprises breaking a weakened area extending radially along the tear-away sections.

15. The method of claim 14, wherein removing the at least one tear-away section from each of the two discs also comprises breaking a circular weakened area defining an inner circumference of the tear-away section.

16. The method of claim 12, wherein mounting the cover comprises inserting fasteners through apertures defined in attachment sections of the cover.

17. The method of claim 12, further comprising mounting the drum plate assembly to a mounting surface prior to unwinding the length of the subscriber cable from the cable spool assembly.

18. The method of claim 12, further comprising attaching a second end of the subscriber cable to a feeder cable input location prior to unwinding the length of the subscriber cable from the cable spool assembly.

19. A fiber optic enclosure comprising:
    a cable spool assembly including a first flange and a second flange spaced apart axially along a drum portion to define a storage space, each flange having a removable section that extends radially outward from a central portion of the flange, the cable spool assembly having a first cross-dimension when the removable sections are attached to the flanges, the central portion of each flange having a second cross-dimension; and a termination region disposed on an outer surface of the central portion of the first flange of the cable spool assembly, the termination region including a plurality of adapters that rotate in unison with the first flange;

a base plate including a generally planar surface, wherein the second flange is disposed closer to the base plate than the first flange; and a cover that cooperates with the base plate after the removal sections are removed from each flange to form a single chamber enclosure, wherein the cable spool assembly and the termination region are mounted within the single chamber enclosure, the cover having a lateral dimension that is smaller than the first cross-dimension of the cable spool assembly and larger than the second cross-dimension of the cable spool assembly.

20. The fiber optic enclosure of claim 19, wherein the cable spool assembly is mounted to a drum plate assembly that is configured to mount to a surface so that the cable spool assembly is rotatable relative to the surface.

21. The fiber optic enclosure of claim 20, wherein the cable spool assembly is rotatable relative to the drum plate assembly.

22. The fiber optic enclosure of claim 20, further comprising a termination region disposed on the first flange of the cable assembly, the termination region including a plurality of adapters that rotate in unison with the first flange.

23. The fiber optic enclosure of claim 22, wherein the termination region also includes a fanout arrangement.

24. The fiber optic enclosure of claim 22, wherein the adapters are mounted to a frame extending upwardly from the first flange.

25. The fiber optic enclosure of claim 24, wherein the adapters include eight columns of three adapters.

26. The fiber optic enclosure of claim 22, wherein the termination region also includes a wall that extends at least partly around the termination region.

27. The fiber optic enclosure of claim 22, further comprising a subscriber cable having a first end and a second end, the first end of the subscriber cable being routed to the adapters at the termination region and a portion of the subscriber cable being wound within the storage space of the cable assembly.

28. The fiber optic enclosure of claim 19, wherein the removable section of each flange is attached to the central portion of the flange along a circular weakened area.

29. The fiber optic enclosure of claim 28, wherein additional weakened areas extend radially from the weakened area of each flange.

30. The fiber optic enclosure of claim 29, wherein the additional weakened areas include four weakened areas.

* * * * *